Patented July 9, 1940

2,207,384

UNITED STATES PATENT OFFICE 2,207,384

SYNTHETIC RESIN AND METHOD OF MAKING SAME

Israel Rosenblum, New York, N. Y.

No Drawing. Application December 19, 1936, Serial No. 116,822

10 Claims. (Cl. 260—51)

The present invention relates to the production of fusible, oil-soluble synthetic resins by reaction of a phenol and an aldehyde, and more particularly to the modification of such resins by the incorporation therein of a terpene compound, such as terpene hydrocarbons and alcohols.

The present application is a continuation-in-part of my copending applications Ser. No. 538,248, filed May 18, 1931; Ser. No. 580,495, filed Dec. 11, 1931; and Ser. No. 594,379, filed Feb. 20, 1932.

It is the general object of the present invention to provide an improved and inexpensive method for the production of phenol-aldehyde resins which are insoluble in water but are soluble in the common resin solvents, and are compatible with drying and non-drying oils, and with nitrocellulose, and are accordingly suitable for the manufacture of varnishes, lacquers, paints and other coating compositions, particularly air drying varnishes when drying oils are used.

According to the present invention, resins of the type indicated are obtained by incorporating therein in practically non-separable form, a relatively large proportion, up to equal amounts (referred to the phenol), and even more, of a terpene compound, preferably a high boiling compound, such as dipentene, terpineol, and commercial mixtures of terpene compounds, such as pine oil, which contains in addition to dipentene and terpineol also borneol, carvacrol, fenchyl alcohol etc.

In my British Patent 416,476 there is disclosed a process involving the reaction of a phenol with various proportions of formaldehyde in the presence of a terpene compound, such as dipentene or terpineol, or the mixture present in pine oil, whereby oil-soluble resins are obtained in which the terpene compound remains in the final product to the extent of about 10% by weight of the phenol used, the terpene compound or compounds not being completely expelled even upon heating to high temperatures, indicating a probable chemical combination with the phenol-formaldehyde condensate.

I have now found that much larger quantities of terpene compounds can be incorporated or combined in the resin by the use of sulphuric acid as a catalyst, at least toward the close of the reaction. In this way larger yields of resinous product are obtained with the aid of the relatively inexpensive terpenic material. Any desired catalyst may be employed during the initial stages of the combination of the phenol and formaldehyde, after which, preferably following dehydration of the condensate, sulphuric acid is added and the condensation continued, advantageously at higher temperatures until a fusible soluble resin is obtained which is solid at room temperatures.

The expression "terpene compound" as used in this specification and in the claims is to be understood to mean not only terpene hydrocarbons, such as dipentene, but also compounds which may be regarded as terpenic derivatives, such as the terpene alcohols represented by terpineol, borneol, fenchyl alcohol and the like, their esters etc.

The higher homologues can be used with advantage and in general I prefer to employ butyl and amyl phenols and the still higher homologues either alone or admixed with ordinary phenol. By virtue of the presence of the terpenic material, the molecular proportion of formaldehyde to phenol may be as high as 3 to 1 or more.

When a catalyst other than sulphuric acid is employed for the initial reaction, the process is carried out in two main stages. Thus, the phenol, aldehyde and the catalyst are reacted in the presence of a suitable terpene compound, preferably alphaterpineol or dipentene, or a mixture of these compounds, by being heated at the boiling temperature under a reflux or under pressure in a closed vessel to a temperature of about 110° C., for about 12 to 16 hours or more. The water is drawn off or distilled away, and the product may then be further condensed and dehydrated by heating it in an inert atmosphere or under vacuum to a temperature of about 120° C. until a clear uniform resin is obtained which is semi-solid or solid at room temperatures. To the product so obtained more terpenic material may be added to bring the total content of the latter to the desired proportion and the reaction between the terpenic material and the phenolic condensate is then accelerated by the addition of sulfuric acid. The sulfuric acid may be used alone or admixed with other acidic material, such as hydrochloric acid. Upon completion of the reaction a product is obtained in which an unusually large quantity of terpenic material is inseparably incorporated, and most probably chemically combined, with the phenol-formaldehyde condensate.

Any suitable catalyst may be employed during the initial stages of condensation, including basic, neutral and acid catalysts, such as sodium hydroxide, sodium carbonate, zinc oxide, zinc acetate, sulfuric acid, hydrochloric acid and other known catalysts for the reaction between phenol and formaldehyde. When sulphuric acid or a mixture of sulphuric acid and other catalytic material is employed as accelerating agent for the initial condensation, all the materials can be mixed together from the start and condensed, dehydrated and further reacted in a continuous process. Toward the end of the reaction the sulfuric acid may be neutralized with sodium hydroxide or other inorganic or organic base.

The terpenic material may be first partially condensed or polymerized with the sulfuric acid and then added to the phenol-aldehyde reaction mixture as described more in detail below.

The invention will be further described with the aid of the following examples which are presented for purposes of illustration and not by way of limitation:

*Example 1.*—A resin derived from the interaction of:

| | Parts |
|---|---|
| Butylphenol | 100 |
| 40% formaldehyde solution | 100 |
| Dipentene | 30 |

(all parts by weight) with zinc acetate as catalyst (0.25 to 2 parts), by refluxing at the boiling point for about 16 hours, drawing off the separated water and heating the material to about 120° in order to dehydrate it further, is treated further with 65 parts dipentene (which brings the dipentene proportion to the ratio of 1 mol dipentene to 1 mol butylphenol) thinned with hi-flash naphtha for better operation, and 44 grams of strong 96% sulfuric acid, which are added slowly with constant agitation so as to keep the temperature around 60° C. The stirring at 60° is kept up for 2–3 hours. A two layer system is formed; the lower layer, practically all sulfuric acid, is drawn off; the upper layer is neutralized with NaOH solution, the slightly alkaline solution is again acidified with an acid to a point where an organic sodium salt (of the phenolic resin or of phenol) is no longer present. The mass is then washed with water and steam distilled up to a temperature of about 230° C. which removes the non-combined solvents and reactants. The yield is around 90–100% of theoretical, based on the combined weights of the phenol and terpene. The acid number is about 20, whereas that of the resin produced in the absence of the terpene is about 70, indicating that the dipentene is chemically bound to the phenolic resin. This resin is compatible with drying and non-drying oils, with resins like rosin, dammar, ester gums, dry distilled fossil gum and their esters, cumarones, asphaltums, pitches, etc., with solvents such as mineral spirits, toluol, or their mixtures, and is excellently suited for the manufacture of air-drying varnishes, nitrocellulose lacquers, etc.

*Example 2.*—A resin obtained from the interaction of:

| | Parts |
|---|---|
| Phenol | 47 |
| 40% CH$_2$O solution | 47 |
| Alpha terpineol | 77 | with zinc acetate as a catalyst, after condensation for 16 hours under reflux and drawing off of separated water, is subjected to the sulfuric acid treatment, as in Example 1. The resin is then further treated as in Example 1. The product contains practically the whole alpha terpineol, corresponding to the ratio of 1 mol of terpineol to 1 mol of phenol chemically bound to the phenol condensate. The acid value is about 15. The resin is oil-soluble and produces varnishes of great durability.

*Example 3.*—Like Example 1, except that instead of dipentene, a mixture of dipentene and terpineol is used. A product similar to that of Example 1 is obtained.

*Example 4.*—Like Example 2, with the exception that phenol is replaced by ortho, meta or para cresol or xylenol or a mixture thereof. During the addition of sulfuric acid, the temperature is kept below 50° C., preferably about 30° C. An oil-soluble resin is obtained which, like those of Examples 1–3, is solid at room temperature.

*Example 5.*—A resin derived from the interaction of butylphenol, formaldehyde and dipentene in the presence of NaOH solution, wherefrom the NaOH has been removed by neutralization and washing with water, the proportions taken being:

| | Parts |
|---|---|
| Butylphenol | 100 |
| 40% formaldehyde solution | 100 |
| Dipentene | 25 | is treated further with 70 parts dipentene which brings up the dipentene proportion to the ratio of 1 mol dipentene to 1 mol of phenol. A uniform solution is obtained, which can be further diluted with solvent naphtha. To this solution 250 parts sulfuric acid of 70% strength are added slowly with vigorous stirring, care being taken to keep the temperature around 50° C. 200 parts of strong sulfuric acid (96% strength) are now added slowly, the temperature being still kept at about 50° C. and the vigorous stirring continued for about 3 hours. A two layer system is formed, the lower layer containing practically all the sulfuric acid, and the upper layer containing the resin, solvent and some sulfuric acid. The latter is neutralized with hot 10% NaOH solution and washed with water. The reaction in the still plastic mass is carried further by heating in an inert atmosphere with stirring to a temperature of about 230° C. in order to expel all non-combined material, which in this case consists of all the solvent naphtha, water and very little free dipentene and butylphenol. In the resin thus finally obtained practically all the dipentene appears to be bound chemically to the butylphenol condensate, as none can be removed with steam at even 230° C. and the yield of resin is about 95% of the theoretical, based on the total butylphenol condensate and dipentene. The acid value of the resin is 10–20 or even lower. The resin is oil soluble, giving excellent alkali resistant varnishes, which can be used as such or in conjunction with suitable pigments for enamels and also as a binder material in the manufacturing of linoleum and similar covering materials.

*Example 6.*—Using the same phenolic resin as in Example 5, the amount of additional dipentene is increased to 157 parts, so that the total proportion is 2 mols. dipentene to 1 mol butylphenol. Following otherwise the same method, a resin is obtained in which again practically the total dipentene is chemically bound to the butylphenol condensate.

*Example 7.*—The above procedure may be varied by using a much smaller proportion of strong sulfuric acid but at a higher temperature, namely, around 200° C. A butylphenol resin prepared as in Example 1 from

| | Parts |
|---|---|
| Butylphenol | 100 |
| 40% formaldehyde solution | 100 |
| Dipentene | 30 | and zinc acetate catalyst is dehydrated as described in the prior examples, the intermediate product still containing about 5% dissolved free formaldehyde. The product is treated with an additional 65 parts of dipentene to bring the dipentene content up to a 1:1 molecular ratio with reference to the phenol and, after addition of only about 5 parts of strong (96%) sulfuric acid, is heated gradually to about 200° C. Sulfur dioxide is given off during this heating and all the sulfuric acid can be removed in this way. The formation of $SO_2$ is partly due to reaction between the dissolved free formaldehyde and the sulfuric acid. The removal of the last portions of the sulfuric acid may be hastened by steam distillation at about 200° C. or above.

Despite the use of strong sulfuric acid at high temperature, no charring takes place. The resin is pale and oil-soluble. Its acid value is about 15–20 and the yield is about 180 grams.

Example 8.—Like Example 7, but in the preparation of the phenol-formaldehyde resin dilute sulfuric acid is used as a catalyst, instead of zinc acetate. After condensation the separated water is removed and the plastic resin may be more fully dehydrated and further condensed by heating in a current of inert gas to about 120° C. This material is then treated with dipentene and strong sulfuric acid as in Example 7. A similar product is obtained.

The above procedures may be modified in the following manner and still yield highly satisfactory resins. The terpene material, such as dipentene, terpineol, or pine oil, may first be partially condensed by heating with sulfuric acid. Although higher temperatures may be employed, I prefer to conduct the heating at about 60° C. for about three hours. In this way a relatively heavy liquid is obtained, but the reaction may, if desired, be conducted until a higher stage of polymerization is reached. The sulfuric acid may then be washed out with water, followed by treatment with an alkaline material to remove traces of acid, and by further washing; or the liquid may be immediately neutralized and then washed with water. In any event, the substantially neutral material is dehydrated and then mixed with a dehydrated partially condensed mixture of a phenol, formaldehyde and a catalyst, such as zinc acetate. If desired, the dehydration of the terpenic polymer and the phenol-formaldehyde condensate may take place after the two materials have been mixed, and the terpene material may be added while it is still acidic, the neutralization and washing of the mixture taking place after heating together to some extent. The proportions of the different materials may correspond to those of any of the above examples. The more or less neutral mixture is now further heated as above-described, the final heating being preferably at about the boiling point of the terpene material or higher until all volatile matter has been expelled. There is obtained a resin which is solid at room temperatures and in which is incorporated a relatively large quantity of the terpene material, the amount being in the neighborhood of equimolecular proportions with reference to the phenol or mixture of phenols and even higher.

The resins produced as described hereinabove are soluble in the common resin solvents including acetone, turpentine, pine oil and its individual components, mineral spirits (petroleum distillates), etc.; and they are particularly suitable for the manufacture of oil varnishes as they are soluble in the drying and non-drying oils, including linseed, China-wood, perilla, sunflower seed, rubberseed, soya bean, cottonseed, fish and other vegetable and animal oils and mixtures thereof. The resins are preferably condensed to the point at which they are solid at room temperature, but the reaction may be stopped when the resins are plastic at ordinary temperatures, especially when the proportion of ordinary phenol and formaldehyde is high. The resins are suitable for the manufacture of varnishes, lacquers, paints, etc. and also for the production of linoleum compositions by mixture or combination with linoxyn and similar materials. If desired, the drying or non-drying vegetable oils may be added to the reacting mixture, preferably toward the close of the reaction, producing oil-modified resins or even varnishes, which yield very hard films.

While aluminum halides, zinc chloride and other dehydrating catalysts may in some instances be employed in place of sulfuric acid, I have found the latter to yield the best results.

The phenolic resin to which the terpenic polymer is added may be one that is either solid or liquid at room temperatures.

In the case of the butyl and amyl phenols above mentioned, the para tertiary compounds are preferred; in the case of cresol, the ortho, meta and para compounds can be used either individually or in admixture.

In general the process is preferably so conducted and the proportion of formaldehyde is made sufficiently large (about 2 mols or more to each mol of phenol) that after dehydration at about 120° C. the phenolic condensate contains considerable amounts of free or dissolved or loosely bound formaldehyde. Preferably, at least a portion of the terpene compound is present during the initial condensation of the phenol and formaldehyde, the remainder being added after the dehydration. The reaction with sulfuric acid can take place either at relatively low temperatures (20–70° C.), in which case larger amounts of acid or stronger acids can be employed; or the reaction may proceed at temperatures up to about 240° C., in which case smaller amounts of acids (up to about 10% of pure acid based on the amount of phenol) and of lower strength are used. In the latter instance the sulfuric acid is practically all destroyed during the reaction, either by evaporation or by chemical reaction, so that frequently no washing will be necessary, provided only that sufficient formaldehyde was present when the sulfuric acid was added.

The acid numbers of the resins produced as above described are generally considerably lower than those of similar phenol formaldehyde resins produced in the absence of the terpenic material, even after making due allowance for the diluting effect of the terpenic material. This fact indicates that a chemical combination has taken place between the phenol formaldehyde condensate and the terpenic material.

If desired, natural resins or their esters may be employed in the above process, although they are not necessary for imparting oil-solubility. If rosin is employed, it is desirable to have it present during the sulfuric acid treatment as its acidic quality appears to supplement the action of the mineral acid.

In place of the phenols mentioned above, the condensation products of phenols and ketones may be used, such as dihydroxyphenyldimethylmethane and dihydroxymethylphenyldimethylmethane.

I claim:

1. The method of producing fusible, water-insoluble phenolic resins which are soluble in organic solvents, which comprises condensing a phenol having a substituting alkyl group of at least four carbon atoms, and formaldehyde in the presence of a terpene compound which is normally liquid and is capable of taking part in the resinification reaction, and of a catalyst, further reacting the terpene-containing mass in the presence of a sulfuric acid to cause combination between the phenol-formaldehyde condensate and the terpene compound, and heating the product so obtained until a still soluble resin is obtained which is solid at room temperature and is substantially free from unreacted material.

2. The method of producing fusible, water-insoluble phenolic resins which are soluble in organic solvents, which comprises condensing a phenol and an aldehyde to the intermediate, soluble stage, and reacting the condensate in the presence of sulfuric acid with a normally liquid terpene compound capable of combining with the condensate.

3. The method of producing fusible, water-insoluble phenolic resins which are soluble in organic solvents, which comprises condensing a phenol and formaldehyde to the intermediate, soluble stage, reacting the condensate in the presence of sulfuric acid with a normally liquid terpene compound capable of combining with the condensate, and thereafter removing the sulfuric acid.

4. The method of producing fusible, water-insoluble phenolic resins, which are soluble in organic solvents, which comprises condensing a phenol and formaldehyde to the intermediate, soluble stage, and reacting the condensate with dipentene with the aid of sulfuric acid.

5. The method of producing fusible, water-insoluble, phenolic resins which are soluble in organic solvents, which comprises condensing a phenol and formaldehyde in the presence of dipentene and of a catalyst, to the intermediate, soluble stage, further condensing the dipentene-containing mass in the presence of sulfuric acid to cause reaction between the dipentene and the phenol-formaldehyde condensate, and finally heating the reaction product to expel unreacted material until a resin which is substantially solid at room temperature but remains soluble in organic solvents is obtained.

6. The method of producing fusible, water-insoluble phenolic resins which are soluble in organic solvents, which comprises condensing a phenol and formaldehyde in the presence of an organic zinc compound to the intermediate, soluble stage, and then reacting the condensate with a normally liquid terpene material consisting primarily of dipentene in the presence of sulfuric acid.

7. A fusible resin comprising the reaction product of a soluble, intermediate condensate of a phenol and an aldehyde, and a normally liquid terpene compound in the presence of sulfuric acid, and produced in accordance with the process of claim 2, said resin being insoluble in water but soluble in varnish solvents.

8. A fusible resin comprising the reaction product of a soluble, intermediate condensate of a phenol and formaldehyde, and dipentene in the presence of sulfuric acid and produced in accordance with the process of claim 4.

9. A fusible resin comprising the reaction product of a soluble, intermediate condensate of a phenol and formaldehyde, and an amount of a normally liquid terpene compound approximately equivalent to the weight of phenol, in the presence of sulfuric acid, and produced in accordance with the process of claim 2, said resin being insoluble in water but soluble in varnish solvents.

10. A fusible, zinc-containing resin comprising the reaction product of a soluble, intermediate condensate of a phenol and formaldehyde, and a normally liquid terpene material consisting primarily of dipentene in the presence of sulfuric acid and produced in accordance with the process of claim 6.

ISRAEL ROSENBLUM.